UNITED STATES PATENT OFFICE.

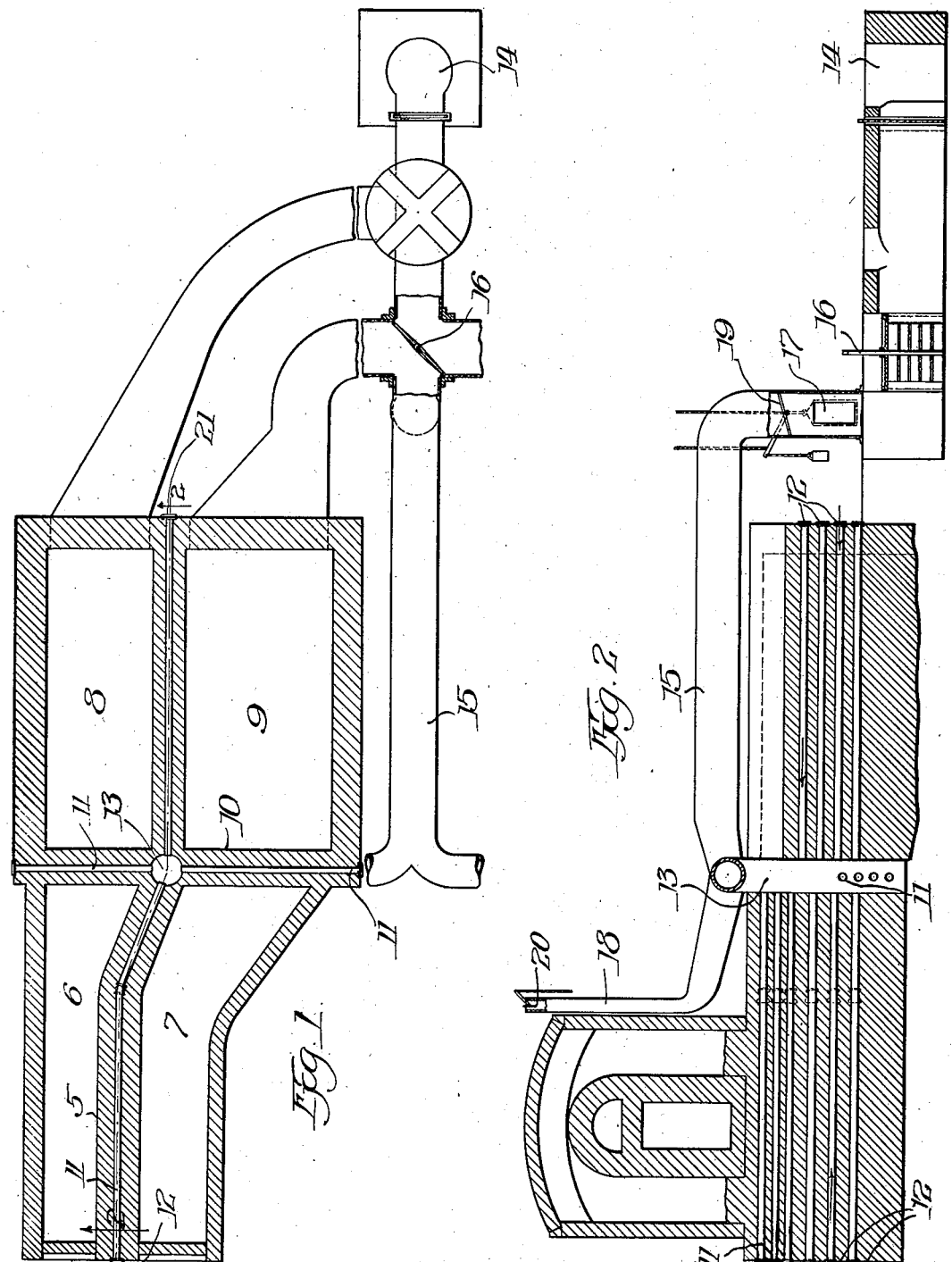

GEORGE L. DANFORTH, JR., AND SAMUEL NAISMITH, OF SOUTH CHICAGO, ILLINOIS.

METALLURGICAL FURNACE.

1,185,290.   Specification of Letters Patent.   Patented May 30, 1916.

Application filed January 24, 1916. Serial No. 73,872.

*To all whom it may concern:*

Be it known that we, GEORGE L. DANFORTH, Jr., and SAMUEL NAISMITH, citizens of the United States, and residents of South Chicago, county of Cook, and State of Illinois, have invented certain new and useful Improvements in Metallurgical Furnaces, of which the following is a specification.

Our invention relates to cooling means for the walls of regenerative furnaces, especially those used for metallurgical purposes. The slag pockets of such furnaces are designed to receive the melted brick work from above and to prevent the oxid of iron, silica, fine dolomite, etc., from being drawn into the checker chambers from the combustion chamber of the furnace by the draft of the stack. At each end of such furnaces there is one gas and one air slag pocket, also one gas and one air checker chamber, and between the slag pockets and checker chambers there is a bridge wall built of fire brick to prevent the fluid slag escaping from the slag pockets into the checker chambers. The present division walls separating the gas and air slag pockets and those separating the gas and air checker chambers are a source of great trouble caused by the gas leaking through the walls and being prematurely ignited, burning down the brick work and consuming the gas that should go to the combustion chamber to perform the heating or melting. Frequently the condition of these division walls determines the duration of the campaign of the furnace, and with present designs and arrangements the furnaces have to be shut down for several days about four times per year to make the necessary repairs to division walls.

An object of our invention is to remedy such conditions by circulating cold air through the centers of the division walls, preferably by means of a series of pipes arranged to run horizontally through the walls dividing the gas and air slag pockets, the gas and air checker chambers, and the bridge walls between the slag pockets and checker chambers. All pipes running through the division walls are connected with a chimney, or to the air-reversing valve of the furnace, thus causing a circulation of the cooling medium and the preservation of the surrounding brick work.

Our invention further comprises the details of construction and arrangement of parts hereinafter described and claimed, reference being had to the accompanying drawings wherein:

Figure 1 is a sectional plan view through the slag pockets and checker chambers of a furnace; and Fig. 2 is a vertical longitudinal section taken through the construction of Fig. 1.

In the drawings, which represent the preferred embodiment of our invention, similar reference numerals refer to similar parts throughout the drawings.

Embedded in the division walls 5, separating the gas and air slag pockets 6 and 7 and the gas and air checker chambers 8 and 9, and also in the walls 10 separating the slag pockets from the checker chambers, is a series of pipes 11 running horizontally from the outside of the division walls where the cold air enters, as indicated at 12, thence to a manifold 13 from which the air can either be drawn to the stack 18, which extends up the end of the furnace; or can be taken along pipes 15 to the air-reversing valve 16. By leading the preheated air from the pipes 11 and 13 to the air valve 16, thereby using the same in air checker chambers instead of air at atmospheric temperature, the fuel consumption in the furnace is considerably reduced. Likewise, circulation through the pipes is insured on account of being connected with the furnace draft. We may provide an auxiliary air inlet 17 to the valve in case the pipes 11 should not supply enough air for complete combustion in the furnace. This arrangement permits of using either the auxiliary chimney 18, or the furnace stack 14. Above the air inlet 17 we provide a pivoted valve 19 in the pipe 15. Also in the upper portion of chimney 18 is a pivoted valve 20. By closing the valve 19 and opening valve 20, the waste heat ascends through auxiliary chimney 18 and the air to the furnace enters at inlet 17. Or by closing the valve 20 and opening the valve 19, the preheated air enters by way of the air-reversing valve 16 to the air checkers 9. To regulate the amount of air admitted to pipe 11 we provide hinged covers 21 at the outside ends thereof.

Without air cooled pipes the division walls generally are in a pasty or soft condition all the time, caused by the high temperature on both sides of the wall, making them very susceptible to leakage of gas and molten slag.

We claim:

1. The combination with metallurgical furnaces having slag pockets and checker chambers, of intersecting partition walls therebetween, a plurality of pipes embedded in said walls, a central vertical flue at the intersection of said walls, said pipes communicating with said flue and extending therefrom to the outer surfaces of said walls, and exhaust connections to said flue, substantially as described.

2. The combination with metallurgical furnaces having slag pockets and checker chambers, of intersecting partition walls therebetween, a vertical flue at said point of intersection, a series of pipes embedded in said walls and connecting with said flue, the outer ends of said pipes terminating exteriorly of said walls and provided with valves, and exhaust connections to said flue, substantially as described.

3. In combination, a metallurgical furnace, slag pockets and checker chambers therebeneath, intersecting partition walls between said pockets and chambers, gas or air connections to regulate the flow therethrough, a stack in coöperative engagement with said connections, and cooling means in said walls comprising a plurality of pipes embedded in said partition walls, a vertical flue in the intersection of said walls, and connected with said pipes, exhaust connections between said flue and said stack, a regulating valve in said exhaust connections, a supplemental chimney connected to said flue, a regulating valve in such connection, said pipes adapted to connect with the atmosphere and having valves near such connection, substantially as described.

GEORGE L. DANFORTH, JUNIOR.
SAMUEL NAISMITH.

Witnesses:
M. J. DEVANEY,
THOS. J. MORGAN.